United States Patent [19]

Hiraiwa

[11] Patent Number: 5,129,039

[45] Date of Patent: Jul. 7, 1992

[54] RECURRENT NEURAL NETWORK WITH VARIABLE SIZE INTERMEDIATE LAYER

[75] Inventor: Atsunobu Hiraiwa, Kanagawa, Japan

[73] Assignee: Sony Corporation, Tokyo, Japan

[21] Appl. No.: 727,871

[22] Filed: Jul. 10, 1991

Related U.S. Application Data

[62] Division of Ser. No. 406,733, Sep. 13, 1989.

[30] Foreign Application Priority Data

| Sep. 17, 1988 | [JP] | Japan | 63-232845 |
| Sep. 17, 1988 | [JP] | Japan | 63-232846 |
| Sep. 20, 1988 | [JP] | Japan | 63-235441 |

[51] Int. Cl.$^5$ ............................................. G06F 15/18
[52] U.S. Cl. .................................................... 395/24
[58] Field of Search ................... 364/513; 395/22, 23, 395/24

[56] References Cited

PUBLICATIONS

Neural Net Pruning—Why and How; Sietsma et al.; Proceedings of IEEE Int. Conf. on Neural Networks; vol. I; pp. 325-333; 1988.

*Primary Examiner*—Allen R. MacDonald
*Attorney, Agent, or Firm*—Lewis H. Eslinger; Jay H. Maioli

[57] ABSTRACT

The present invention is concerned with a signal processing system having a learning function pursuant to the back-propagation learning rule by the neural network, in which the learning rate is dynamically changed as a function of input values to effect high-speed stable learning. The signal processing system of the present invention is so arranged that, by executing signal processing for the input signals by the recurrent network formed by units each corresponding to a neuron, the features of the sequential time series pattern such as voice signals fluctuating on the time axis can be extracted through learning the coupling state of the recurrent network. The present invention is also concerned with a learning processing system adapted to cause the signal processing section formed by a neural network to undergo signal processing pursuant to the back-propagation learning rule, wherein the local minimum state in the course of the learning processing may be avoided by learning the coefficient of coupling strength while simultaneously increasing the number of the unit of the intermediate layer.

5 Claims, 10 Drawing Sheets

RECURRENT NEURAL NETWORK WITH VARIABLE SIZE INTERMEDIATE LAYER

This is a division of application Ser. No. 07/406,733, filed Sep. 13, 1989.

BACKGROUND OF THE INVENTION

1. Field of the Invention

This invention relates to a signal processing apparatus or system carrying out signal processing with the use of a so-called neural network made up of a plurality of units each taking charge of signal processing corresponding to that of a neuron, and a learning processing apparatus or system causing a signal processing section by said neural network to undergo a learning processing in accordance with the learning rule of back propagation.

2. Prior Art

The learning rule of back propagation, which is a learning algorithm of the neural network, has been tentatively applied to signal processing, including high speed image processing or pattern recognition, as disclosed in "Parallel Distributed Processing", vol. 1, The MIT Press, 1986 or "Nikkei Electronics, issue of Aug. 10, 1987, No. 427, pp 115 to 124. The learning rule of back propagation is also applied, as shown in FIG. 1, to a multilayer neural network having an intermediate layer 2 between an inputlayer 1 and an output layer 3.

Each unit $u_j$ of the neural network shown in FIG. 1 issues an output value which is the total sum $net_j$ of output values $O_i$ of a unit $u_j$ coupled to the unit $u_j$ by a coupling coefficient $W_{ji}$, transformed by a predetermined function f, such as a sigmoid function. That is, when the value of a pattern p is supplied as an input value to each unit $u_j$ of the input layer 1, an output value $O_{pj}$ of each unit $u_j$ of the intermediate layer 2 and the output layer 3 is expressed by the following formula (1)

$$O_{pj} = f_j(net_{pj}) \qquad (1)$$
$$= f_j\left(\sum_i W_{ji} \cdot O_{pji}\right)$$

The output value $O_{pj}$ of the unit $u_j$ of the output layer 3 may be obtained by sequentially computing the output values of the inputs $u_j$, each corresponding to a neuron, from the input layer 1 towards the output layer 3.

In accordance with the back-propagation learning algorithm, the processing of learning consisting in modifying the coupling coefficient $W_{ji}$ so as to minimize the total sum $E_p$ of square errors between the actual output value $O_{pj}$ of each unit $u_j$ of the output layer 3 on application of the pattern p and the desirable output value $t_{pj}$, that is the teacher signal, $$E_p = \frac{1}{2}\sum_j (t_{pj} - O_{pj})^2 \qquad (2)$$

is sequentially performed from the output layer 3 towards the input layer 1. By such processing of learning, the output value $O_{pj}$ closest to the value $t_{pj}$ of the teacher signal is output from the unit $u_j$ of the output layer 3.

If the variant $\Delta W_{ji}$ of the coupling coefficient $W_{ji}$ which minimizes the total sum $E_p$ of the square errors is set so that $$\Delta W_{ji} \propto \partial E_p / \partial W_{ji} \qquad (3)$$

the formula (3) may be rewritten to $$\Delta W_{ji} = \eta \cdot \delta_{pj} O_{pj} \qquad (4)$$

as explained in detail in the above reference materials.

In the above formula (4), $\eta$ stands for the rate of learning, which is a constant, and which may be empirically determined from the number of the units or layers or from the input or output values. $\delta_{pj}$ stands for the error corresponding to the unit $u_j$.

Therefore, in determining the above variant $\Delta W_{ji}$, it suffices to compute the error $\delta_{pj}$ in the reverse direction, or from the output layer towards the input layer of the network.

The error $\delta_{pj}$ of the unit $u_j$ of the output layer 1 is given by the formula (5)

$$\delta_{pj} = (t_{pj} - O_{pj})f'_j(net_j) \qquad (5)$$

The error $\delta_{pj}$ of the unit $u_j$ of the intermediate layer 2 may be computed by a recurrent function of the following formula (6)

$$\delta_{pj} = f'_j(net_j) \sum_k \delta_{pk} W_{kj} \qquad (6)$$

using the error $\delta_{pk}$ and the coupling coefficient $W_{kj}$ of each unit $u_k$ coupled to the unit $u_j$, herein each unit of the output layer 3. The process of finding the above formulas (5) and (6) is explained in detail in the above reference materials.

In the above formulas, $f'_j(net_j)$ stands for the differentiation of the output function $f_j(net_j)$.

Although the variant $w_{ji}$ may be found from the above formula (4), using the results of the formulas (5) and (6), more stable results may be obtained by finding it from the following formula (7)

$$\Delta W_{ji(n+1)} = \eta \cdot \delta_{pj} + 60 \cdot \Delta W_{ji(n)} \qquad (7)$$

with the use of the results of the preceding learning. In the above formula, $\alpha$ stands for a stabilization factor for reducing the error oscillations and accelerating the convergence thereof.

The above described learning is repeated until it is terminated at the time point when the total sum $E_p$ of the square errors between the output value $O_{pj}$ and the teacher signal $t_{pj}$ becomes sufficiently small.

It is noted that, in the conventional signal processing system in which the aforementioned back-propagation learning rule is applied to the neural network, the learning constant is empirically determined from the numbers of the layers and the units corresponding to neurons or the input and output values, and the learning is carried out at the constant learning rate using the above formula (7). Thus the number of times of repetition n of the learning until the total sum $E_p$ between the output value $O_{pj}$ and the teacher signal $t_{pj}$ becomes small enough to terminate the learning may be so large as to render the efficient learning unfeasible.

Also, the above described signal processing system is constructed as a network consisting only of feedforward couplings between the units corresponding to the neurons, so that, when the features of the input signal pattern are to be extracted by learning the coupling state of the above mentioned network from the input signals and the teacher signal, it is difficult to extract the sequential time series pattern or chronological pattern of the audio signals fluctuating on the time axis.

In addition, while the processing of learning of the above described multilayer neural network in accordance with the back-propagation learning rule has a promisingly high functional ability, it may occur frequently that an optimum global minimum is not reached, but only a local minimum is reached, in the course of the learning process, such that the total sum $E_p$ of the square errors cannot be reduced sufficiently.

Conventionally, when such local minimum is reached, the initial value or the learning rate $\eta$ is changed and the processing of learning is repeated until finding the optimum global minimum. This results in considerable fluctuations and protractions of the learning processing time.

OBJECTS OF THE INVENTION

It is a primary object of the present invention to provide a signal processing system in which the number of times of repetition of learning until termination of learning may be reduced to realize a more efficient learning.

It is a second object of the present invention to provide a signal processing system adapted to extract the features of the sequential time-series patterns of, for example, audio signals, fluctuating on the time axis, by learning of the coupling states in a network constituted by plural units corresponding to neurons.

It is a third object of the present invention to provide a learning processing system in which the signal processing section of the neural network is subjected to learning processing in accordance with a back-propagation learning rule, wherein the local minimum state in the learning processing process may be efficiently avoided, and instead realizing an optimum global minimum state quickly and stably.

SUMMARY OF THE INVENTION

For accomplishing the primary object of the present invention, the present invention provides a signal processing system in which the learning constant $\eta$ is normalized with a learning variable $\beta$ indicated by a reciprocal of the square sum of the input value $O_{pj}$ at each unit, added to by 1, to cause the learning rate to be dynamically changed in accordance with the input value $O_{pi}$ to effect learning processing of the coefficient of coupling strength $W_{ji}$ between the units.

For accomplishing the second object, the present invention provides a signal processing system in which signal processing for input signals is performed at the signal processing section in which a recurrent network including loop and feedback circuitry is formed by units of the intermediate and output layers each including delay means, and in which the learning processing section executes learning of the coupling state in the recurrent network formed by the units making up the signal processing section.

For accomplishing the third object, the present invention provides a learning processing system in which the learning processing section therein executes the learning processing of the coupling strength coefficient and increases the number of units of the intermediate layer.

The above and other objects and novel features of the present invention will become apparent from the following detailed description of the invention which is made in conjunction with the accompanying drawings and the new matter pointed out in the claims.

DETAILED DESCRIPTION OF THE EMBODIMENTS

Figure 1:
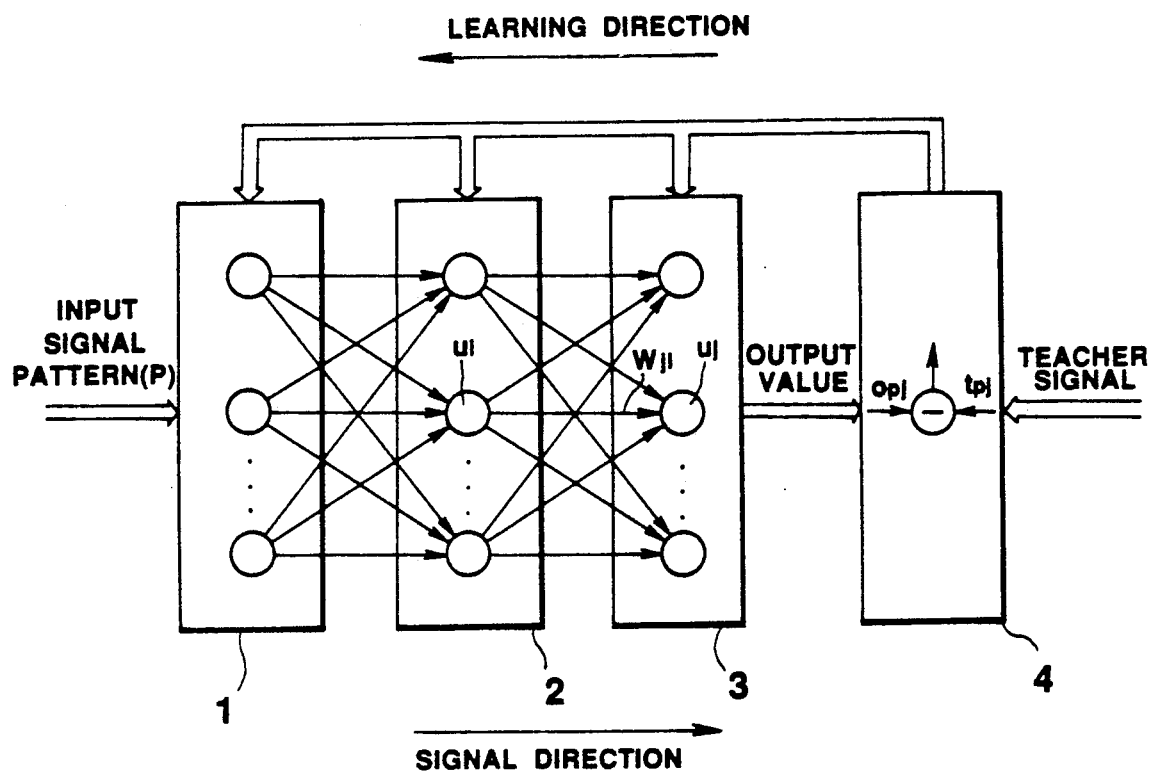
FIG. 1 is a diagrammatic view showing the general construction of a neural network to which the back-propagation learning rule is applied.

By referring to the drawings, certain preferred embodiments of the present invention will be explained in more detail.

Figure 2:
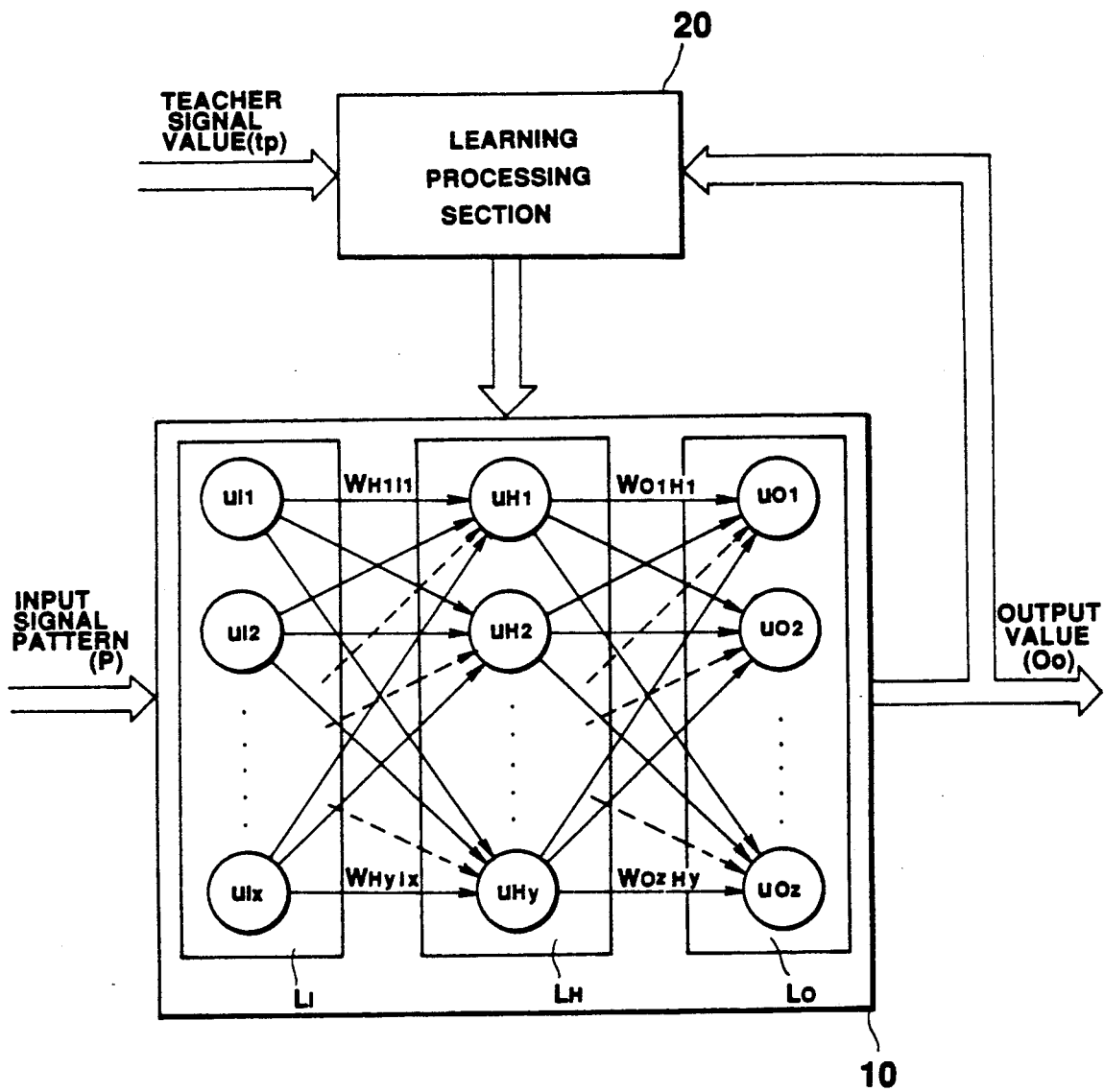
FIG. 2 is a block diagram schematically showing the construction of a signal processing system according to a first embodiment of the present invention.

The signal processing system of the present invention includes, as shown schematically in FIGS. 1 and 2, a signal processing section 10 for producing an output value $O_{pj}$ from input signal patterns p and a signal processing section 20 for executing learning for producing an output value $O_{pj}$ closest to the desired output value $t_{pj}$ from the input signal patterns p by the signal processing section 10.

The signal processing section 10 is formed by a neural network including at least an input layer $L_I$, an intermediate layer $L_H$ and an output layer $L_O$. These layers $L_I$, $L_H$ and $L_O$ are made up of units $u_{I1}$ to $u_{Ix}$, $u_{H1}$ to $u_{Hy}$ and $u_{O1}$ to $u_{O2}$, each corresponding to a neuron, wherein x, y and z each represent an arbitrary number.

Each of the units $u_{I1}$, to $u_{I2}$, $u_{H1}$ to $u_{Hy}$ and $u_{O1}$ to $u_{Oz}$ is designed to issue an output $O_{pj}$ represented by a sigmoid function according to the formula (8)

$$O_{pj} = \frac{1}{1 + e^{-(net_j + \theta_j)}} \quad (8)$$

for the total sum $net_j$ of inputs represented by the formula (9)

$$net_j = \sum_i W_{ji} O_{pi} \quad (9)$$

where $\theta_j$ stands for a threshold value.

Figure 3:
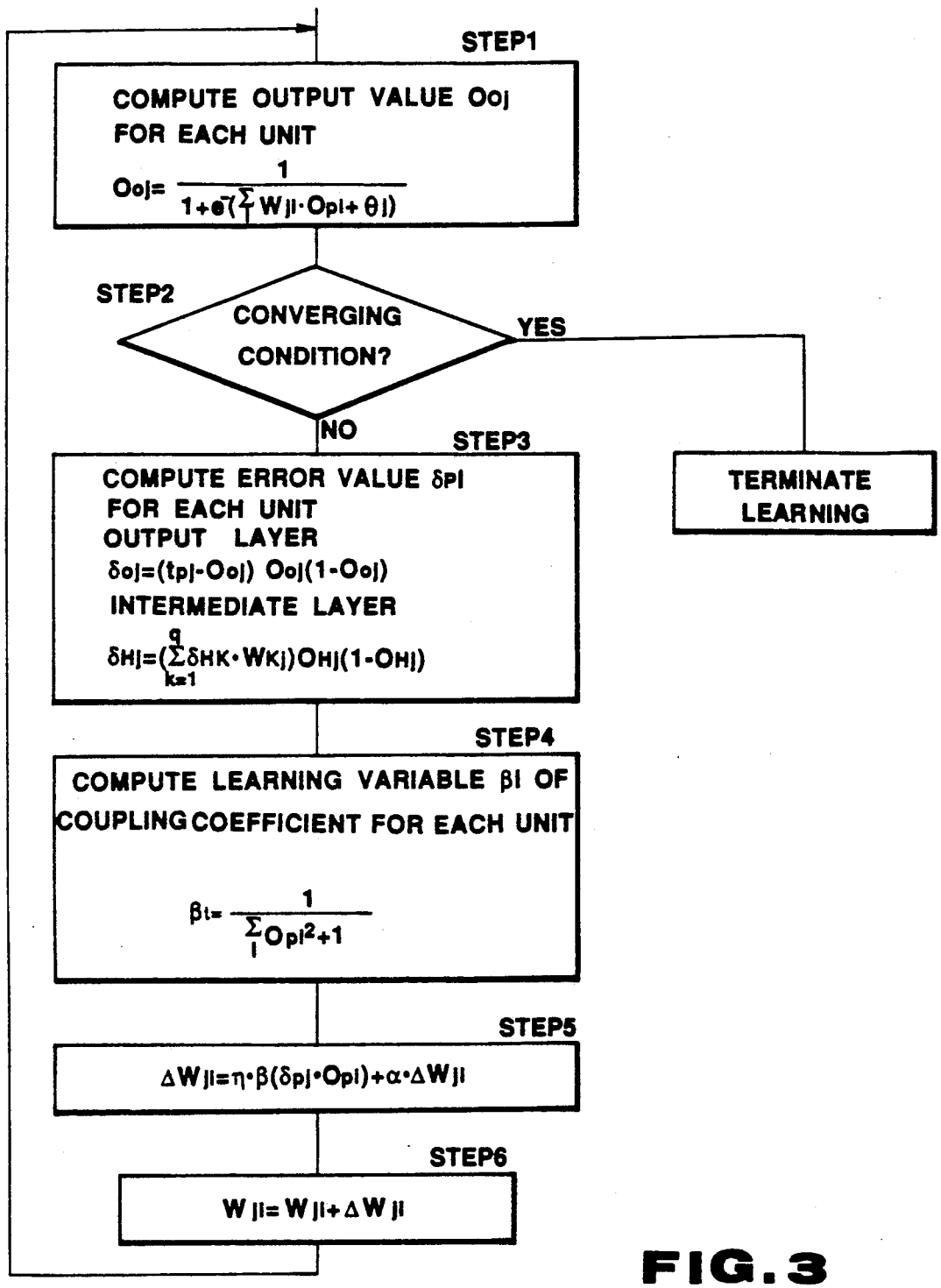
FIG. 3 is a flow chart showing the process of learning processing in the learning processing section constituting the signal processing system according to the embodiment shown in FIG. 2.

The learning processing section 20 is fed with a desired output value $t_{pj}$ as a teacher signal for the output value $O_{oj}$ of the output layer $L_O$ for comparison with the input signal patterns p entered into the signal processing section 10. This learning processing section 10 to undergo learning processing of the coupling coefficient $w_{ji}$, in such a manner that, according to the sequence of steps shown by the flow chart of FIG. 3, the coefficient $W_{ji}$ of the coupling strength between the units $u_{I1}$ to $u_{Ix}$, $u_{H1}$ to $u_{Hy}$ and $u_{O1}$ to $u_{Oz}$ is sequentially and repeatedly computed from the output layer $L_O$ towards the input layer $L_I$, until the sum of the quadratic errors between the desired output value $t_{pj}$ and the actual output value $O_{oj}$ become sufficiently small, in order that the output value $O_{oj}$ of the output layer $L_O$ will be closest to the desired output value $t_{pj}$ supplied as the teacher signal.

Thus, in step 1, the learning processing section 20 affords the coupling coefficient $W_{ji}$ to each of the units $u_{H1}$ to $u_{Hy}$ and $u_{O1}$ to $u_{Oz}$ to compute the output value $O_{oj}$ of the output layer $L_O$ for the input signal patterns p in the signal processing section 10. In step 2, the section 20 executes a decision as to the converging condition for the actual output value $O_{oj}$, on the basis of the total sum $E_p$ of the square errors between the actual output value $O_{oj}$ and the desired output value $t_{pj}$ supplied as the teacher signal.

In the decision step 2, it is decided whether the output value $O_{oj}$ obtained at the output layer $L_O$ of the signal processing section 10 is closest to the desired output value $t_{pj}$. If the result of decision at step 2 is YES, that is, when the total sum $E_p$ of the square errors becomes sufficiently small and the output value $O_{oj}$ is closest to the desired output value $t_{pj}$, the processing of learning is terminated. If the result of decision is NO, the computation operations of steps 3 through 6 are executed sequentially.

In the next computing step 3, the error $\delta_{pj}$ at each of the units $u_{H1}$ to $u_{Hy}$ and $u_{O1}$ to $u_{Oz}$ of the signal processing section 10 is computed. In the computing operation of step 3, the error $\delta_{oj}$ of each of the units $u_{O1}$ to $u_{Oz}$ of the output layer $L_O$ is given by the following formula (10):

$$\delta_{oj} = (t_{pj} - O_{oj}) O_{oj}(1 - O_{oj}) \quad (10)$$

On the other hand, the error $\delta_{pj}$ of each of the units $u_{H1}$ to $u_{Hy}$ of the intermediate layer $L_H$ is given by the following formula (11):

$$\delta_{Hj} = O_{Hj}(1 - O_{Hj}) \sum_k \delta_{ok} \cdot W_{kj} \quad (11)$$

In the next computing step 4, the learning variant $\beta_j$ of the coefficient $W_{ji}$ of the coupling strength from the i'th one to the j'th one of the units $u_{H1}$ to $u_{Hy}$ and $u_{O1}$ to $u_{Oz}$ is computed as a reciprocal of the square sum of the totality of the inputs added to by 1 as the threshold value, that is, in accordance with the following formula (12):

$$\beta_j = \frac{1}{\sum_i O_{pi}^2 + 1} \quad (12)$$

Then, in the computing step 5, the variant $\Delta W_{ji}$ of the coupling coefficient $W_{ji}$ from the i'th one to the j'th one of the units $u_{H1}$ to $u_{Hy}$ and $u_{O1}$ to $u_{Oz}$ is computed, using the above learning variable $\beta_j$, in accordance with the following formula (13)

$$\Delta W_{ji(n+1)} = \eta \cdot \beta (\delta_{pj} O_{pi}) + \alpha \cdot \Delta W_{ji(n)} \quad (13)$$

where $\eta$ stands for the learning constant and $\alpha$ the stabilization constant for reducing the error oscillations and accelerating the convergence thereof.

Then, in the computing step 6, the coupling coefficient $W_{ji}$ of the units $u_{H1}$ to $u_{Hy}$ and $u_{O1}$ to $u_{Oz}$ is modified, on the basis of the variant $W_{ji}$ of the coupling coefficient $W_{ji}$ computed at step 5, in accordance with the following formula (14):

$$w_{ji} = w_{ji} + \Delta w_{ji} \quad (14)$$

Then, revert to step 1, the output value $O_{oj}$ of the output layer $L_O$ for the input patterns p at the signal processing section 10 is computed.

The learning processing section 20 executes the above steps 1 through 6 repeatedly, until the learning processing is terminated by the decision at step 2 when the total sum $E_p$ of the square error between the desired output $t_{pj}$ afforded as the teacher signal and the output value $O_{oj}$ becomes sufficiently small and the output value $O_{oj}$ obtained at the output layer $L_O$ of the signal processing section 10 is closest to the desired output value $t_{pj}$.

In this manner, in the signal processing system of the present first embodiment, the learning constant $\eta$ is normalized by the above learning variable $\beta$ represented by the reciprocal of the square sum of the input value $O_{pj}$ at each of the units $u_{H1}$ to $u_{Hy}$ and $u_{O1}$ to $u_{Oz}$ added to by 1 as the threshold value. This causes the learning rate to be changed dynamically as a function of the input value $O_{pi}$. By performing the learning processing of the coupling coefficient $W_{ji}$ with the learning rate changed dynamically in this manner as a function of the input value $O_{pi}$, it becomes possible to reduce the number n of times of learning significantly to one fourth to one tenth of that in the case of the conventional learning processing.

It is noted that, by representing the learning constant $\eta$ and the stabilizing constant $\alpha$ in the formula 13 as the function of the maximum error $E_{max}$ for the input patterns as a whole, as shown by the formulas (15) and (16):

$$\eta = a \, E_{max} \quad (15)$$

$$a = -b\, E_{max} + c \quad (16)$$

where a, b and c are constants, and by changing them dynamically, it becomes possible to perform faster learning processing.

According to the above described first embodiment of the signal processing system, the learning constant $\eta$ is normalized by the learning variable $\alpha$ represented by the reciprocal of a square sum of the actual input $O_{pi}$ in each unit added to by 1 as a threshold value to cause the learning rate to be changed dynamically in accordance with the input value $O_{pi}$ and to execute the learning processing of the coupling coefficient $W_{ji}$ so that it becomes possible to perform stable and fast learning.

A second illustrative of the signal processing system according to the present invention will be hereinafter explained.

Figure 5:
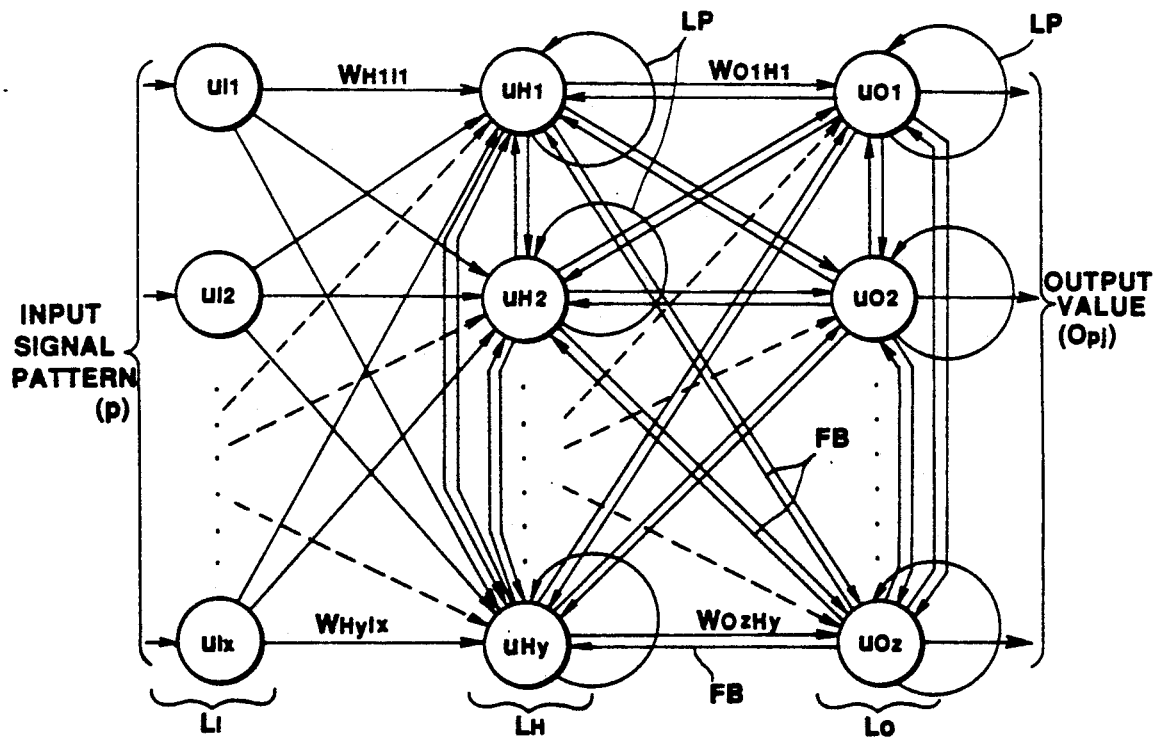
FIG. 5 is a diagrammatic view of a neural network showing the construction of the signal processing section of the signal processing system according to the embodiment shown in FIG. 4.

As shown schematically in FIG. 5, the signal processing system of the present illustrative embodiment includes a signal processing section 30 for obtaining the output value $O_{pj}$ from the input signal patterns p and a learning processing section 40 for causing the signal processing section 30 to undergo learning to obtain the output value $O_{pj}$ closest to the desired output value $t_{pj}$ from the input signal patterns p.

Figure 4:
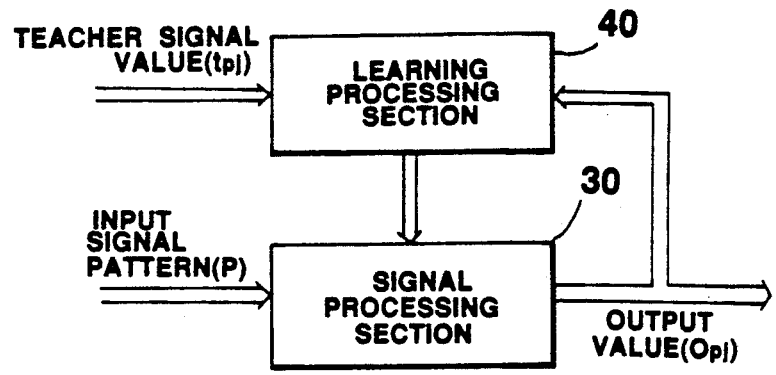
FIG. 4 is a block diagram schematically showing the construction of a signal processing system according to a second embodiment of the present invention.

The signal processing section 30 is formed, as shown in FIG. 4, by a neural network of a three-layer structure including at least an input layer $L_I$, an intermediate layer $L_H$ and an output layer $L_O$. These layers $L_I$, $L_H$ and $L_O$ are constituted by units $u_{I1}$ to $u_{Ix}$, $u_{H1}$ to $u_{Hy}$ and $u_{O1}$ to $u_{Oz}$, each corresponding to a neuron, respectively, where x, y and z stand for arbitrary numbers. Each of the units $u_{H1}$ to $u_{Hy}$ and $u_{O1}$ to $u_{Oz}$ of the intermediate layer $L_H$ and the output layer $L_O$ is provided with delay means and forms a recurrent network including a loop LP having its output $O_{j(t)}$ as its own input by way of the delay means and a feedback FB having its output $O_{j(t)}$ as an input to another unit.

In the signal processing system 30, with the input signal patterns p entered into each of the units $u_{I1}$ to $u_{Ix}$ of the input layer $L_I$, the total sum $net_j$ of the inputs to the units $u_{H1}$ to $u_{Hy}$ of the intermediate layer $L_H$ is given by the following formula (17):

$$net_j = \sum_{e}^{x} \sum_{k=0}^{NI} w_{jx \cdot k + e} O_{ie(t-k)} + \sum_{e}^{y} \sum_{k=1}^{NH} w_{jy \cdot k + i} O_{hi(t-k)} + \sum_{i}^{z} \sum_{k=i}^{NO} w_{jz \cdot k + i} O_{oi(t-k)} + \theta_j \quad (17)$$

Each of the units $u_{H1}$ to $u_{Hy}$ of the intermediate layer $L_H$ issues, for the total sum $net_j$ of the input signals, an output value $O_{Hj(t)}$ represented by the sigmoid function of the following formula (18):

$$O_{j(t)} = \frac{1}{1 + e^{-net}} \quad (18)$$

The total sum $net_j$ of the inputs to the units $u_{O1}$ to $u_{Oz}$ of the output layer $L_O$ is given by the following formula (19):

$$net_j = \sum_{i}^{x} \sum_{k=0}^{NH} w_{jx \cdot k + i} O_{Hi(t-k)} + \sum_{i}^{z} \sum_{k=1}^{NO} w_{jz \cdot k + i} O_{Hi(t-k)} + \theta_j \quad (19)$$

While each of the units $u_{O1}$ to $u_{Oz}$ of the output layer $L_O$ issues, for the total sum $net_j$ of the inputs, an output value $O_{oj(t)}$ represented by the following formula (20):

$$O_{oj(t)} = \frac{1}{1 + e^{-net_j}} \quad (20)$$

where $O_j$ stands for a threshold value and NI, NH and NO stand for the numbers of the delay means provided in the layers $L_I$, $L_H$ and $L_O$, respectively.

Figure 6:
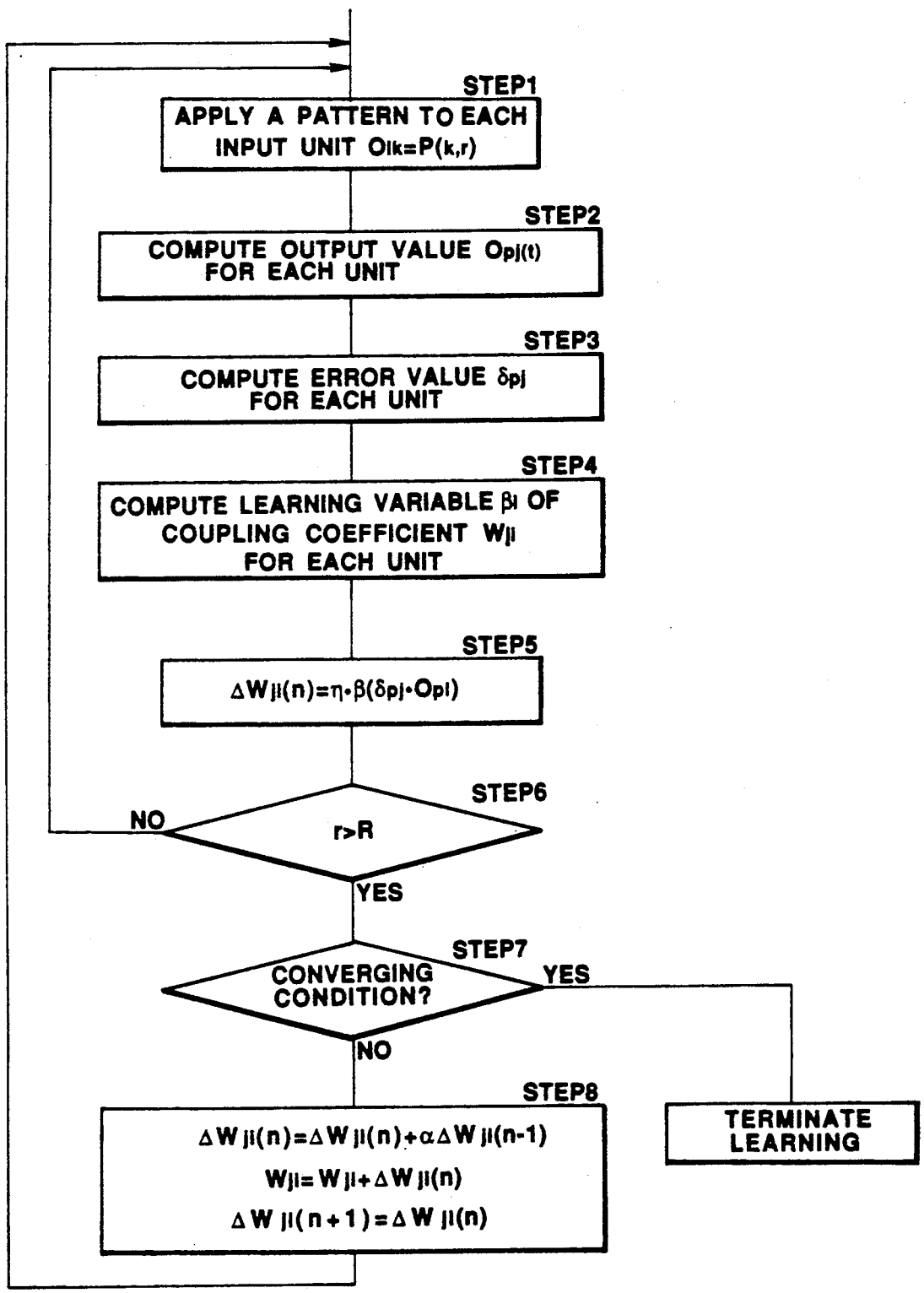
FIG. 6 is a flow chart showing the process of learning processing in the learning processing section constituting the signal processing system of the embodiment shown in FIG. 4.

The learning processing section 40 computes the coefficient $W_{ji}$ of coupling strength between the units $u_{O1}$ to $u_{Oz}$, $u_{H1}$ to $u_{Hy}$ and $u_{I1}$ to $u_{Ix}$, from the output layer $L_O$ towards the input layer $L_I$, sequentially and repeatedly, according to the sequence shown in the flow chart of FIG. 6, while executing the learning processing of the coupling coefficient $W_{ji}$ so that the total sum of the square errors LMS between the desired output value $t_{pj}$ afforded as the teacher signal and the output value $O_{oj}$ of the output layer $L_O$ will be sufficiently small. By such learning processing, the learning processing section 40 causes the output value $O_{oj}$ of the output layer $L_O$ to be closest to the desired output value $t_{zr}$, afforded as the teacher signal patterns, for an input signal pattern $p_{(xr)}$ supplied to the signal processing section 30. This pattern $p_{(xr)}$ represents a information unit as a whole which fluctuates along the time axis and is represented by the xr number of data, where r stands for the number of times of sampling of the information unit and x represents the number of data in each sample.

That is, the section 40 affords at step 1 the input signal patterns $p_{(xr)}$ to each of the units $u_{I1}$ to $u_{Ix}$ of the input layer $L_I$, and proceeds to computing at step 2 each output value $O_{pj(t)}$ of each of the units $u_{H1}$ to $u_{Hy}$ and $u_{O1}$ to $u_{Oz}$ of the intermediate layer $L_H$ and the output layer $L_O$.

The section 40 then proceeds to computing at step 3 the error $\delta_{pj}$ of the units $u_{O1}$ to $u_{Oz}$ and $u_{H1}$ to $u_{Hy}$, from the output layer $L_O$ towards the input layer $L_I$, on the basis of the output values $O_{pj(t)}$ and the desired output value $t_{zr}$ afforded as the teacher signal.

In the computing step 3, the error $\delta_{oj}$ of each of the units $u_{O1}$ to $u_{Oz}$ of the output layer $L_O$ is given by the following formula (21):

$$\delta_{oj} = (t_{pj} - O_{oj}) O_{oj}(1 - O_{oj}) \quad (21)$$

wherein the error $\delta_{pj}$ of each of the units $u_{H1}$ to $u_{Hy}$ of the intermediate layer $L_H$ is given by the following formula (22):

$$\delta_{Hj} = O_{Hj}(1 - O_{Hj}) \sum_{k} \delta_{ok} W_{kj} \quad (22)$$

Then, in step 4, the learning variable $\beta_j$ of the coefficient $W_{ji}$ of coupling strength from the i'th one to the j'th one of the units $u_{I1}$ to $u_{Ix}$, $u_{H1}$ to $u_{Hy}$ and $u_{O1}$ to $u_{Oz}$ is computed by the following formula (23)

$$\beta_j = \frac{1}{\sum_{i} O_{pi}^2 + 1} \quad (23)$$

in which the learning variable $\beta_j$ is represented by the recipropcal of the square sum of the input values added to by 1 as a threshold value.

Then, in step 5, using the learning variable $\beta_j$ computed in step 4, the variant $\Delta_{ji}$ of the coupling coefficient $W_{ji}$ from the i'th one to the j'th one of the units $u_{O1}$ to $u_{Oz}$, $u_{H1}$ to $u_{Hy}$ and $u_{I1}$ to $u_{Ix}$ is computed in accordance with the following formula (24):

$$\Delta w_{ji(n)} = \eta \cdot \beta(\delta_{pj} O_{pi}) \quad (24)$$

In the formula, $\eta$ stands for a learning constant.

Then, in step 5, the total sum LMS of the square errors of the units with respect to the teacher signal is computed in accordance with the formula (25)

$$LMS = \sum_{p=1} \sum_{i=1} (t_{pi} - O_{pi}). \quad (25)$$

Then, in step 6, it is decided whether the processing of the steps 1 through 5 has been performed on the R-number of input signal patterns $p_{xr}$. If the result of the decision at step 6 is NO, the section 40 reverts to step 1. When the result of the decision at step 6 is YES, that is, when all of the variants $\Delta W_{ji}$ of the coupling coefficient $W_{ji}$ between the units $u_{O1}$ to $u_{O2}$, $u_{H1}$ to $u_y$ and $u_{I1}$ to $U_{Ix}$ are computed for the input signal patterns $p_{xr}$, the section 40 proceeds to step 7 to execute a decision of the converging condition for the output value $O_{oj}$ obtained at the output layer $L_O$ on the basis of the total sum LMS of square errors between the output value $O_{oj}$ and the desired output value $t_{pj}$ afforded as the teacher signal.

In the decision step 7, it is decided whether the output value $O_{oj}$ obtained at the output layer $L_O$ of the signal processing section 30 is closest to the desired output value $t_{pj}$ afforded as the teacher signal. When the result of the decision at step 7 is YES, that is, when the total sum LMS of the square errors is sufficiently small and the output value $O_{oj}$ is closest to the desired output value $t_{pj}$, the learning processing is terminated. If the result of the decision at step 7 is NO, the section 40 proceeds to computing at step 8.

In this computing step 8, the coupling coefficient $W_{ji}$ between the units $u_{O1}$ to $u_{Oz}$, $u_{H1}$ to $u_{Hy}$ and $u_{I1}$ to $u_{Ix}$ is modified, on the basis of the variant $W_{ji}$ of the coupling coefficient $W_{ji}$ computed at step 5, in accordance with the following formula (26)

$$\Delta W_{ji(n)} = \Delta W_{ji(n)} + \alpha \Delta W_{ji(n-1)} \quad (26)$$

and the following formula (27)

$$W_{ji(n+1)} = W_{ji(n)} + \Delta W_{ji(n)} \quad (27)$$

After the computing step 8, the section 40 reverts to step 1 to execute the operation of steps 1 to 6.

Thus the section 40 executes the operations of the steps 1 to 8 repeatedly and, when the total sum LMS of the square errors between the desired output value $t_{pj}$ and the actual output value $O_{oj}$ becomes sufficiently small and the output value $O_{oj}$ obtained at the output value $L_O$ of the signal processing section 30 is closest to the desired output value $t_{pj}$ afforded as the teacher signal, terminates the processing of learning by the decision at step 7.

In this manner, in the present second embodiment of the signal processing system, the learning as to the coupling coefficient $W_{ji}$ between the units $u_{O1}$ to $u_{Oz}$, $u_{H1}$ to $u_{Hy}$ and $u_{I1}$ to $u_{Ix}$ of the signal processing section 30 constituting the recurrent network inclusive of the above mentioned loop LP and the feedback FB is executed by the learning processing section 40 on the basis of the desired output value $t_{pj}$ afforded as the teacher signal. Hence, the features of the sequential time-base input signal pattern $p_{xr}$, such as audio signals, fluctuating along the time axis, may also be extracted reliably by the learning processing by the learning processing section 40. Thus, by setting the coupling state between the units $u_{O1}$ to $u_{Oz}$, $u_{H1}$ to $u_{Hy}$ and $u_{I1}$ to $u_{Ix}$ of the signal processing section 30 by the coupling coefficient $W_{ji}$, obtained as the result of learning by the learning processing section 40, the time-series input signal pattern $p_{xr}$ can be subjected to desired signal processing by the signal processing section 30.

Moreover, in the second illustrative embodiment of the present invention, similarly to the previously described first embodiment, the learning constant $\eta$ is normalized by the learning constant $\beta$ indicated as the reciprocal of the square sum of the input values at the units $u_{H1}$ to $u_{Hy}$ and $u_{O1}$ to $u_{Oz}$, and the learning processing as to the coupling coefficient $W_{ji}$ is performed at the dynamically changing learning rate, as a function of the input value $O_{pi}$, so that learning can be performed stably and expeditiously with a small number of times of learning.

In this manner, in the present second embodiment of the signal processing system, signal processing for input signals is performed at the signal processing section 30 in which the recurrent network inclusive of the loop LP and the feedback FB is coustituted by the units $u_{H1}$ to $u_{Hy}$ and $u_{O1}$ to $u_{Oz}$ of the intermediate layer $L_H$ and the output layer $L_O$ each provided with delay means. In the learning processing section 40, the learning as to the coupling state of the recurrent network by the units $u_{H1}$ to $u_{Hy}$ and $u_{O1}$ to $u_{Oz}$ constituting the signal processing section 30 is executed on the basis of the teacher signal. Thus the features of the sequential time-base patterns, fluctuating along the time axis, such as audio signals, can be extracted by the above mentioned learning processing section to subject the signal processing section to the desired signal processing.

A preferred illustrative embodiment learning processing system according to the present invention will be hereinafter explained.

Figure 7:
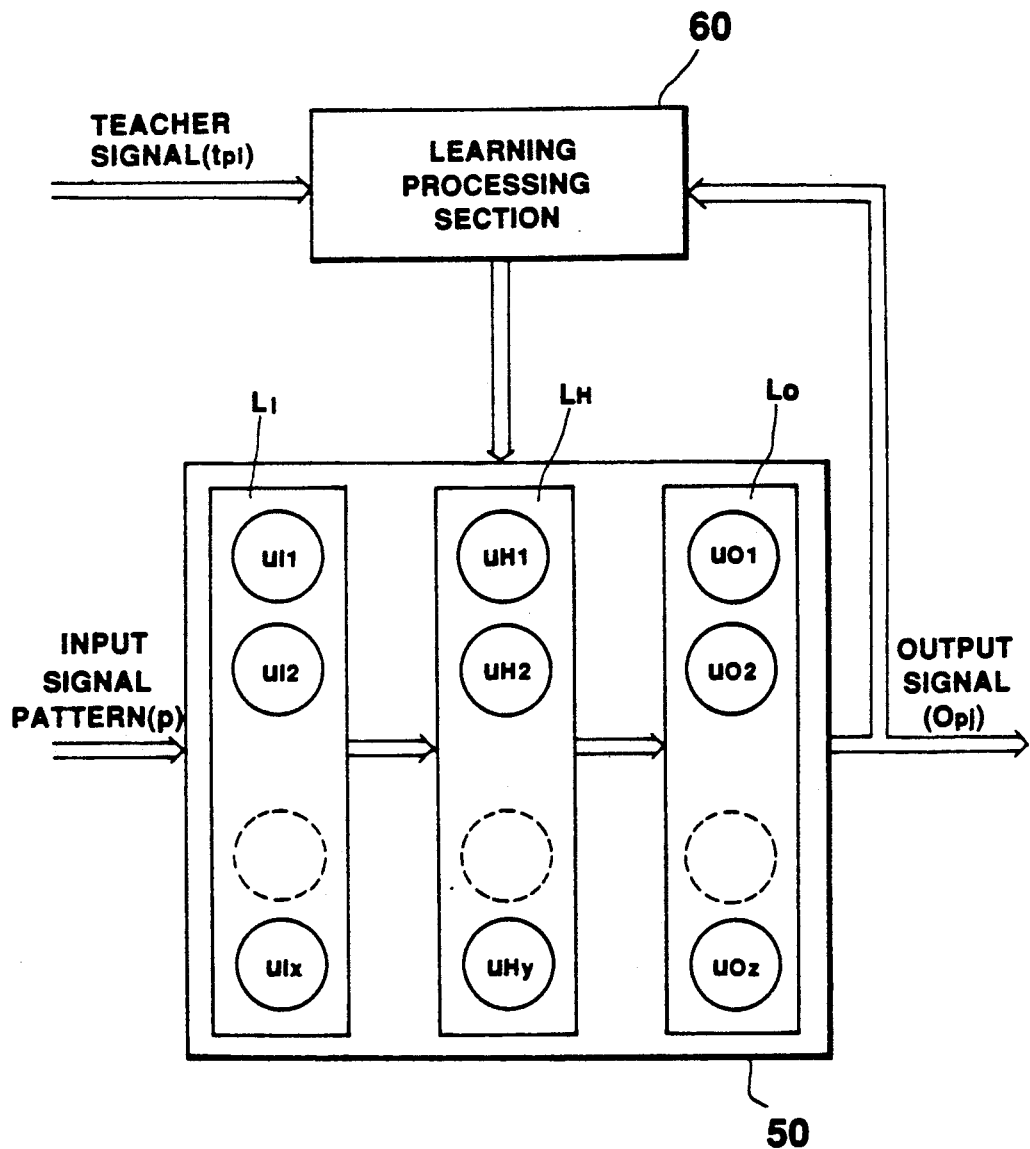
FIG. 7 is a block diagram schematically showing the construction of the learning processing system according to the present invention.

The basic construction of the learning processing system according to the present invention is shown in FIG. 7. As shown therein, the system includes a signal processing section 50 constituted by a neural network of a three-layered structure including at least an input layer $L_I$, an intermediate layer $L_H$ and an output layer $L_O$, each made up of a plurality of units performing a signal processing corresponding to one of a neuron, and a learning processing section 60 incorporating the learning processing into the signal processing consisting in sequentially repeatedly computing the coefficient $W_{ji}$ of coupling strength between the above units from the output layer $L_O$ towards the input layer $L_I$ on the basis of the error data $\delta_{pj}$ between the output value of the output layer $L_O$ and the desired output value $O_{pj}$ afforded as the teacher signal $t_{pj}$, for the input signal patterns p entered into the input layer $L_I$ of the signal processing section 50, and learning the coupling coefficient $W_{ji}$ in accordance with the back-propagation learning rule.

Figure 8A:
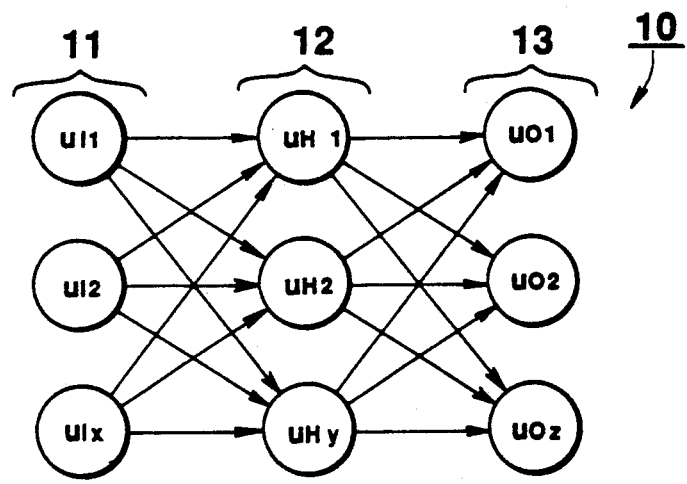
FIGS. 8A and 8B are diagrammatic views showing the state of the signal processing section at the start and in the course of learning processing in the learning processing system.
Figure 8B:
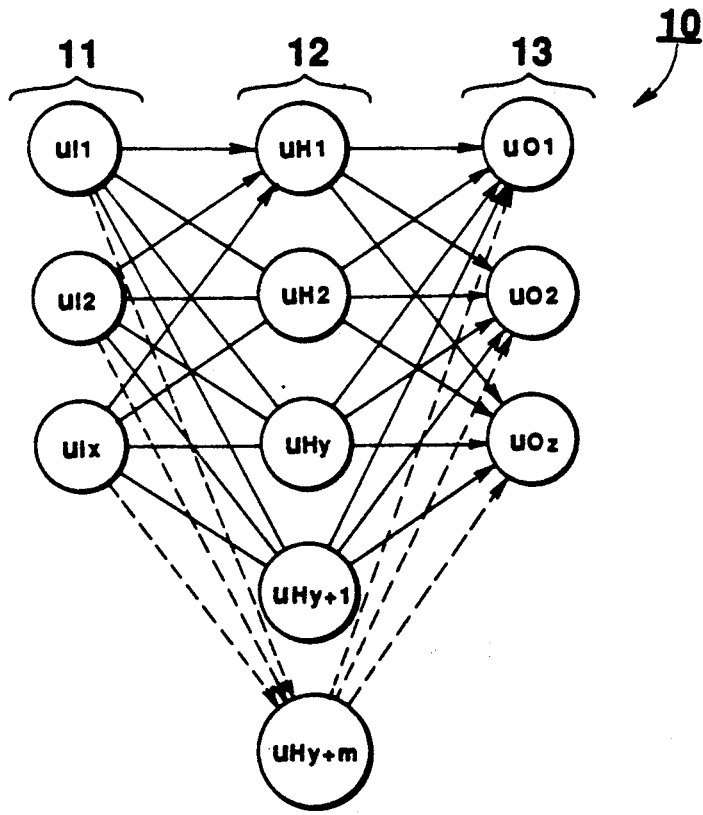

The learning processing section 60 executes the learning processing of the coupling coefficient $W_{ji}$ as it causes the number of the units of the intermediate layer $L_H$ of the signal processing section 50 to be increased, and thus the section 60 has the control function of causing the number of units of the intermediate layer $L_H$ to be increased in the course of learning processing of the coupling coefficient $W_{ji}$. The learning processing section 60 subjects the signal processing section 50 having the input layer $L_I$, an intermediate layer $L_H$ and an output layer $L_O$ made up of arbitrary numbers x, y and z of units $u_{I1}$ to $u_{Ix}$, $u_{H1}$ to $u_{Hy}$ and $u_{O1}$ to $u_{Oz}$, each corresponding to a neuron, respectively, as shown in FIG. 8A, to learning processing as to the coefficient $W_{ji}$, while the section 60 causes the number of the unit $L_H$ to be increased sequentially from y to (y+m), as shown in FIG. 8B.

It is noted that the control operation of increasing the number of the units of the intermediate layer $L_H$ may be performed periodically in the course of learning processing of the coupling coefficient $W_{ji}$, or each time the occurrence of the above mentioned local minimum state is sensed.

The above mentioned learning processing section 60, having the control function of increasing the number of the units of the intermediate layer $L_H$ in the course of learning processing of the coupling coefficient $W_{ji}$, subjects the signal processing section 50 formed by a neural network of a three-layer structure including the input layer $L_I$, intermediate layer $L_H$ and the output layer $L_O$ to the learning processing of the coupling coefficient $W_{ji}$, as it causes the number of units of the intermediate layer $L_H$ to be increased. Thus, even on occurrence of the local minimum state in the course of learning of the coupling coefficient $W_{ji}$, the section 50 is able to increase the number of the units of the intermediate layer $L_H$ to exit from such local minimum state to effect rapid and reliable convergence into the optimum global minimum state.

Figure 9:
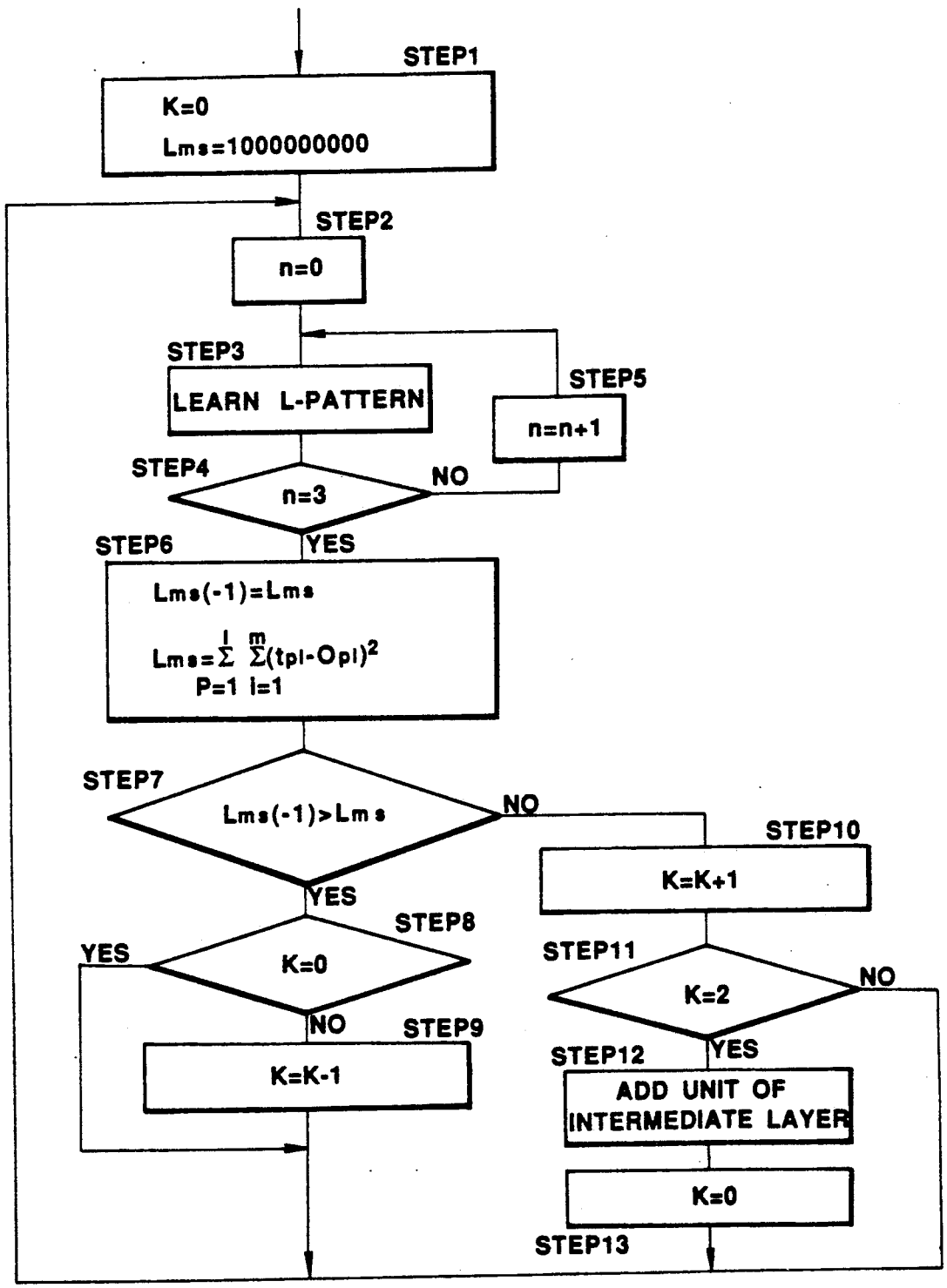
FIG. 9 is a flow chart showing a typical process of learning processing in the learning processing section constituting the learning processing system.

Tests were conducted repeatedly, in each of which the learning processing section 60 having the control function of increasing the number of units of the intermediate layer in the course of learning of the coupling coefficient $W_{ji}$ causes the signal processing section 50 constituting the recurrent network including the feedback FB and the loop LP in the second embodiment of the signal processing system to undergo the process of learning the coefficient $W_{ji}$, with the number of the units of the input layer $L_I$ equaling 8(x=8), that of the output layer $L_O$ equaling 3(z=3), the number of the delay means of each layer of 2 and with the input signal pattern p during learning operation, using 21 time-space patterns of $l = 8 \times 7$, and employing the processing algorithm shown in the flow chart of FIG. 9, with the learning being started at the number of the units of the intermediate layer $L_H$ equaling 3(y=3) and with the number of the units of the intermediate layer $L_H$ being increased during the learning process. By increasing the number of the units of the intermediate layer $L_H$ three to five times, the test results were obtained in which the convergence to the optimum global minimum state were realized without going into the local minimum state.

Figure 10:
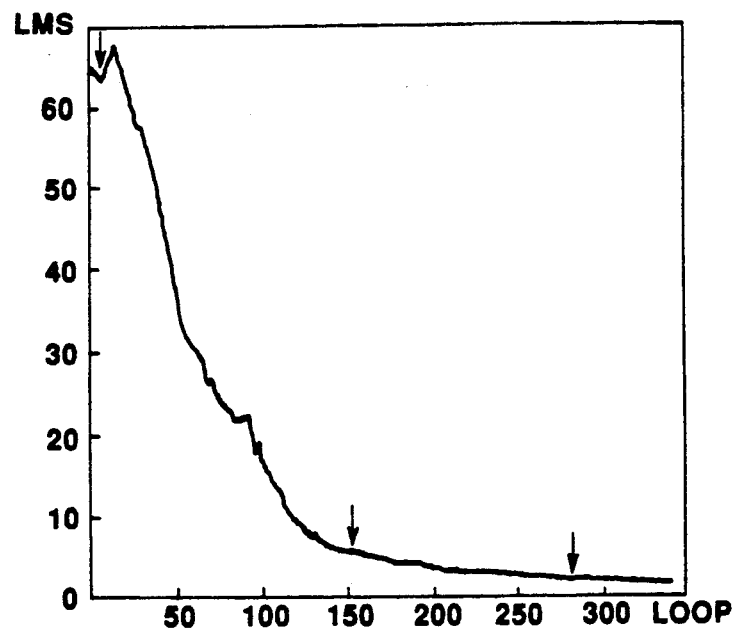
FIG. 10 is a chart showing the typical results of tests of learning processing on the signal processing section of the neural network shown in FIG. 5 by the learning processing section of the learning processing system.

FIG. 10 shows, as an example of the above tests, the test results in which learning processing of converging into the optimum minimum state could be achieved by adding the units of the intermediate layer $L_H$ at the timing shown by the arrow mark in the figure and by increasing the number of the intermediate layer $L_H$ from three to six. The ordinate in FIG. 10 stands for the total sum LMS of the quadratic errors and the abscissa stands the number of times of the learning processing operations.

The processing algorithm shown in the flow chart of FIG. 9 is hereinafter explained.

In this processing algorithm, in step 1, the variable K indicating the number of times of the processing for detecting the local minimum state is initialized to "0", while the first variable Lms for deciding the converging condition of the learning processing is also initialized to 10000000000.

Then, in step 2, the variable n indicating the number of times of learning of the overall learning pattern, that is, the l-number of the input signal patterns p, is initialized. The program then proceeds to step 3 to execute the learning processing of the l-number of the input signal patterns p.

Then, in step 4, decision is made of the variable n indicating the number of times of learning. Unless n=3, the program proceeds to step 5 to add one to n (n→n+1), and then reverts to step 3 to repeat the learning processing. When n=3, the program proceeds to step 6.

In step 6, after the value of the first variable Lms is maintained as the value of the second variable Lms(−1) for deciding the converging condition of the learning processing, the total sum of the square errors between the output signal and the teacher signal in each unit is computed in accordance with the formula (28), this value being then used as the new value for the first variable Lms, such that $$Lms = \sum_{n=1}^{m} \sum_{i=1}^{m} (t_{pi} - O_{pi})^2. \tag{28}$$

Then, in step 7, the first variable Lms for deciding the converging condition of the learning processing is compared with the second variable Lms(−1). If the value of the first variable Lms is less than that of the second variable Lms(−1), the program proceeds to step 8 to decide whether or not the variable K indicating the number of times of the processing operations for detecting the local minimum state is equal to 0.

If, in step 8, the variable K is 0, the program reverts directly to step 2. If the variable K is not 0, setting of K K+1 is made in step 9. The program then reverts to step 2 to initialize n to 0(n=0) to execute the learning processing of the l-number of the input signal patterns p in step 3.

If, in step 7, the value of the first variable Lms is larger than that of the second variable Lms(−1), the program proceeds to step 10 to set the value of K indicating the number of times of the processing operations for detecting the local minimum state (k→k+1). Then, in step 11, it is decided whether or not the value of K is 2.

If, in step 11, the value of the variable K is not 2, the program reverts directly to step 2. If the variable K is 2, it is decided that the local minimum state is prevailing. Thus, in step 12, control is made for increasing the number of the units of the intermediate layer $L_H$. Then, in step 13, setting of k=0 is made. The program then reverts to step 2 for setting of n=0 and then proceeds to step 3 to execute the learning processing of the above mentioned l-number of the input signal patterns p.

Tests on the learning processing were conducted of the signal processing section 50 of the above described second embodiment of the signal processing system constituting the recurrent network including the feedback loop FB and the loop LP shown in FIG. 5, with the number of the units of the intermediate layer $L_H$ being set to six (y=6). The test results have revealed that the learning processing need be repeated an extremely large number of times with considerable time expenditure until the convergence to the optimum minimum state was achieved, and that the local minimum state prevailed for three out of eight learning processing tests without convergence to the optimum global minimum state.

Figure 11:
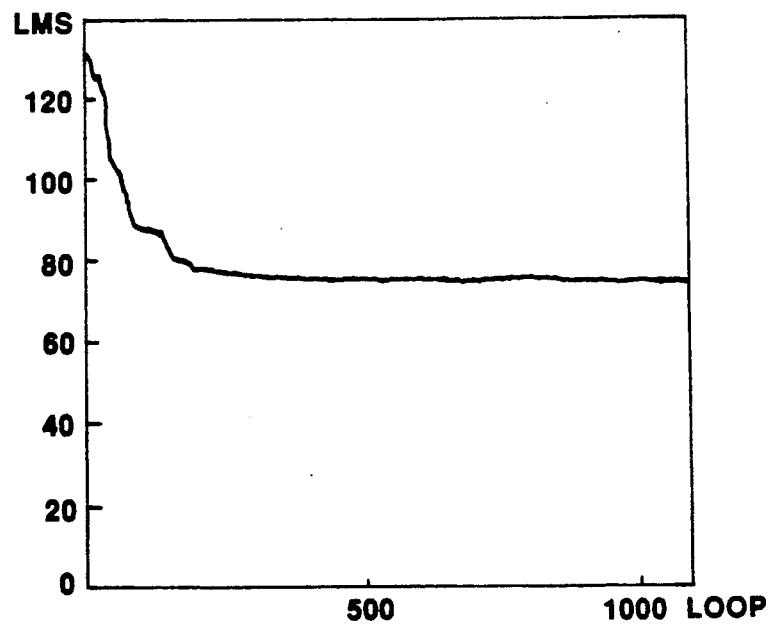
FIG. 11 is a chart showing the results of tests of learning on the signal processing section of the neural network shown in FIG. 5, with the number of units of the intermediate layer fixed at six.

FIG. 11 shows, by way of an example, the results of the learning processing tests in which the local minimum state was reached.

In this figure, the ordinate stands for the total sum LMS of the square errors and the abscissa stands the number of times of the learning processing operations.

Also the tests on the learning processing was conducted 30 times on the signal processing section 50 of the above described second embodiment of the signal processing system constituting the recurrent network including the feedback loop FB and the loop LP shown in FIG. 5, with the number of the units of the intermediate layer $L_H$ being set to three (y=3). It was found that, as shown for example in FIG. 12, the local minimum state was reached in all of the tests on learning processing without convergence to the optimum global minimum state.

Figure 12:
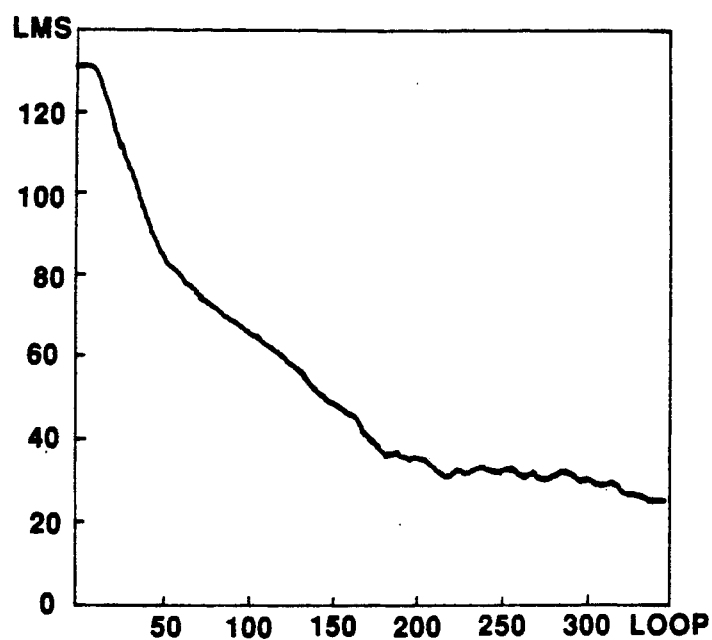
FIG. 12 is a chart showing the results of tests of learning on the signal processing system of the neural network shown in FIG. 5, with the number of units of the intermediate layer fixed at three.

In FIG. 12, the ordinate stands for the total sum LMS of the square errors and the abscissa stands the number of times of the learning processing operations.

From the foregoing it is seen that the present invention provides a learning processing system in which the learning processing of the coefficient of coupling strength is performed, while the number of the units of the intermediate layer is increased by the learning processing section, whereby the convergence to the optimum global minimum state is achieved promptly and reliably to achieve the stable learning processing to avoid the local minimum state in the learning processing process conforming to the back-propagation learning rule.

What is claimed is:

1. A learning processing system comprising
    a signal processing section including at least an input layer, an intermediate layer and an output layer, each of said layers being made up of a plurality of signal processing units, and
    a learning processing section for repeatedly and sequentially computing, from said output layer towards said input layer, a coefficient $W_{ji}$ of coupling strength between said output layer and said intermediate layer and said intermediate layer and said input layer of said signal processing section on the basis of error data $\delta_{ji}$ between an output value of said output layer for input signal patterns entered into said input layer and a predetermined output value denoted as a teacher signal, thereby performing learning processing of said coefficient of coupling strength, wherein control means are provided in said learning processing section for increasing the number of said signal processing units of said intermediate layer, and wherein said learning processing section performs learning processing of said coefficient of coupling strength as said learning processing section causes the number of said signal processing units of said intermediate layer to be increased.

2. The learning processing system according to claim 1 wherein said signal processing section is a neural network of multi-layer structure including said input layer, said intermediate layer and said output layer, each of said layers being constituted by said plurality of signal processing units for performing signal processing corresponding to that of a neuron.

3. A signal processing system comprising
    a signal processing section including at least an input layer, an intermediate layer and an output layer, each of said layers being made up of a plurality of signal processing units, and
    a learning processing section for repeatedly and sequentially computing, from said output layer towards said input layer, a coefficient of coupling strength between said output layer and said intermediate layer and said intermediate layer and said input layer of said signal processing section on the basis of error data between an output value of said output layer for input signal patterns entered into said input layer and a predetermined output value denoted as a teacher signal, thereby performing learning processing of said coefficient of coupling strength, wherein
    each of said signal processing units of said intermediate layer and of said output layer is provided with delay means and wherein said signal processing section is arranged as a recurrent network including loop and feedback circuitry, said loop circuitry being arranged so that an output of said intermediate layer is its own input after passing through said delay means and an output of said output layer is its own input after passing through said delay means, and said feedback circuitry is arranged so that an output of said output layer is fed to an input of said intermediate layer.

4. The signal processing system according to claim 3 wherein said signal processing section is a neural network of a multi-layer structure including said input layer, said intermediate layer and said output layer, each of said layers being constituted by said plurality of signal processing units each performing signal processing corresponding to that of a neuron.

5. The signal processing system according to claim 3 wherein control means are provided in said learning processing section for increasing the number of said signal processing units of said intermediate layer, and wherein said learning processing section performs said learning processing of said coefficient of coupling strength as said learning processing section causes the number of said signal processing units of said intermediate layer to be increased.

* * * * *